United States Patent
Walstad

(10) Patent No.: US 8,698,014 B1
(45) Date of Patent: Apr. 15, 2014

(54) WEIGHT SCALE WITH REMOTE READOUT

(76) Inventor: David M. Walstad, Clearlake Oaks, CA (US)

(*) Notice: Subject to any disclaimer, the term of this patent is extended or adjusted under 35 U.S.C. 154(b) by 553 days.

(21) Appl. No.: 13/017,841

(22) Filed: Jan. 31, 2011

Related U.S. Application Data

(60) Provisional application No. 61/299,359, filed on Jan. 29, 2010.

(51) Int. Cl.
*G01G 21/28* (2006.01)
(52) U.S. Cl.
USPC .......................................... 177/126; 177/238
(58) Field of Classification Search
USPC .................... 177/126, 132–134, 211, 238
See application file for complete search history.

(56) References Cited

U.S. PATENT DOCUMENTS

| | | | | |
|---|---|---|---|---|
| 2,582,886 A * | 1/1952 | Ruge | ........................... | 73/862.53 |
| 3,226,584 A * | 12/1965 | Pintell | ........................... | 310/162 |
| 3,949,822 A * | 4/1976 | English et al. | ................ | 177/126 |
| 3,967,690 A | 7/1976 | Northcutt | | |
| 4,082,153 A | 4/1978 | Provi | | |
| 4,203,497 A * | 5/1980 | Harris et al. | .................. | 177/134 |
| 4,800,973 A * | 1/1989 | Angel | ........................... | 177/211 |
| 4,969,112 A * | 11/1990 | Castle | ........................... | 702/173 |
| 5,234,065 A | 8/1993 | Schmidt | | |
| 5,434,367 A * | 7/1995 | Salini | ........................... | 177/189 |
| 5,714,695 A * | 2/1998 | Bruns | ....................... | 73/862.641 |
| 5,786,549 A | 7/1998 | Serizawa | | |
| 5,872,319 A * | 2/1999 | Bruns et al. | ............... | 73/862.641 |
| 5,886,302 A * | 3/1999 | Germanton et al. | .......... | 177/199 |
| 6,563,059 B2 * | 5/2003 | Lee | ................. | 177/177 |
| 6,590,166 B2 * | 7/2003 | Yoshida | ..................... | 177/25.13 |
| 6,781,067 B2 | 8/2004 | Montagnino et al. | | |
| 6,797,894 B2 * | 9/2004 | Montagnino et al. | ......... | 177/238 |
| 6,864,436 B1 * | 3/2005 | Nobes et al. | ............... | 177/25.13 |
| 6,875,932 B2 * | 4/2005 | Tuft | ........................... | 177/25.13 |
| 7,009,119 B2 * | 3/2006 | Carlucci et al. | ............... | 177/199 |
| 7,550,682 B2 * | 6/2009 | Lawler et al. | ............... | 177/25.16 |
| 7,994,440 B2 * | 8/2011 | Oseko et al. | ................... | 177/238 |
| 2004/0049131 A1 * | 3/2004 | Tuft | ............................. | 600/587 |
| 2005/0115745 A1 * | 6/2005 | Kroll et al. | ..................... | 177/126 |
| 2005/0230157 A1 * | 10/2005 | Tuft | ............................. | 177/126 |
| 2006/0265195 A1 | 11/2006 | Woodard et al. | | |
| 2009/0205876 A1 * | 8/2009 | Claypool | ................... | 177/25.13 |

* cited by examiner

*Primary Examiner* — Randy W Gibson
(74) *Attorney, Agent, or Firm* — Robert C. Montgomery; Montgomery Patent & Design

(57) ABSTRACT

An apparatus that provides for the measurement of a person's weight via a portable remote readout located at eye-level. The weight measuring device comprises a low profile mat with weight sensors that are activated whenever someone steps on the mat. The sensors communicate a sensor weight signal to a transmitter, which in turn communicates the weight signal to a receiver preferably located at eye-level and provided with a variety of mounting means. A preferred embodiment provides for a magnet which enables mounting of the receiver on a refrigerator door. Such a location is envisioned to provide an incentive for those trying to lose weight, by providing one's current weight on the refrigerator door to avoid any unnecessary snacks.

16 Claims, 7 Drawing Sheets

WEIGHT SCALE WITH REMOTE READOUT

RELATED APPLICATIONS

The present invention was first described in and claims the benefit of U.S. Provisional Application No. 61/299,359 filed Jan. 29, 2010, the entire disclosures of which are incorporated herein by reference.

FIELD OF THE INVENTION

The present invention relates generally to personal weight scales, and in particular, to a personal weight scale for constant use along a floor surface and with a remote digital readout.

BACKGROUND OF THE INVENTION

A growing number of persons worldwide are overweight, or may be afflicted with a number of other conditions for which weight monitoring is a concern. There are many different ways of combating additional weight including dieting, exercise, medications, surgery and the like.

One (1) item that is common to all methods of weight loss is that of measurement and tracking. If no one ever weighs themselves, they will never know if their diet or other routine is working or not. Often, a household scale is used to track this information. However, even when such scales are accurate, they can be difficult to read. This is particularly true if the user is vision impaired and do not have their eyeglasses handy.

Furthermore, such scales are often considered to be unsightly and as a result are kept hidden away. This adds up to a significant amount of time spent setting up the scale when performed on a daily basis. Keeping the scale stored also requires additional nearby space to be available. Additional, storing the scale removes the scale from constant viewing by the user, whereas if the scale is always present it can provide a constant reminder to weigh in and remain vigilant about weight loss.

Various attempts have been made to provide portable or otherwise inconspicuous weight measurement devices. Examples of these attempts can be seen by reference to several U.S. patents. U.S. Pat. No. 3,967,690, issued in the name of Northcutt, describes an electronic digital readout diet scale including a means for detecting and displaying changes in a user's weight within a small fraction of pounds.

U.S. Pat. No. 5,234,065, issued in the name of Schmidt, describes a portable weight measuring device including a fluid circuit and a pressure converting unit for digital readout of the weight of an object placed on the device. The Schmidt device is foldable for storage and transport.

U.S. Pat. No. 6,781,067, issued in the name of Montagnino et al., describes a floor tile scale and will display apparatus including a scale which is installed beneath a floor surface and a digital display providing display and transmission of weight and other medical information.

U.S. Pat. No. 6,900,398, issued in the name of Lee, describes a removable personal floor scale which mounts into a pit prepared in masonry or an opening in a framed floor such that it is substantially flush with the surrounding floor surface.

While these devices fulfill their respective, particular objectives, each of these references suffer from one (1) or more of the aforementioned disadvantages. Many such devices are not portable. Also, many such devices, portable and otherwise, are not suitable for constant use in a wide range of household locations due to aesthetic considerations and their hindering of usable floor space. Furthermore, many such devices include an output which is difficult to view. In addition, many such devices are not widely configurable or adaptable to various user needs and locations. Accordingly, there exists a need for a weight scale without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a weight scale which can be inconspicuously and safely placed in a number of household locations for repeated and simple use. Thus, the object of the present invention is to solve the aforementioned disadvantages and provide for this need.

To achieve the above objectives, it is an object of the present invention to measure and display a user's weight. The apparatus includes a low-profile weight-measuring scale assembly and a wireless display assembly.

Another object of the present invention is to position the scale assembly along a floor surface and mount the display assembly on a nearby vertical surface to facilitate viewing of the weight readout from the apparatus. The display assembly is particularly adapted to mount to a refrigerator door with a plurality of magnets disposed along corners of a rear surface of the display assembly.

Yet still another object of the present invention is to comprise the display assembly of a rechargeable battery and a household power adapter for powering of the display assembly and recharging of the battery, respectively. The power adapter is removed between charges to enable the display to operate in a fully wireless manner.

Yet still another object of the present invention is to similarly comprise the scale assembly of a rechargeable battery and a power adapter.

Yet still another object of the present invention is to comprise the scale assembly of a low-profile scale body to facilitate use along a highly trafficked floor area. The scale body includes a pair of opposing ramps comprising tapered profiles along the side portions of the scale body in order to prevent tripping on the scale. The scale body is further provided with a cover which provides a comfortable and decorative surface for the user to stand upon.

Yet still another object of the present invention is to determine a user's weight by converting a force into an electrical signal with a plurality of load cells integral to the scale assembly. Each load cell includes a spring and a strain gauge whose conductivity is affected when the spring is deflected.

Yet still another object of the present invention is to convert the electrical signals from the load cells into a digital signal with a transmitter module integral to the scale assembly. The transmitter module includes a transmitter in wireless communication with a receiver module integral to the display assembly.

Yet still another object of the present invention is to include a liquid-crystal display within the display assembly which provides a visual indication of the weight signal received by the receiver module. The liquid-crystal display can be placed at a desired location along a vertical surface or other household location according to the user's preference for viewing the information while standing on the scale assembly.

Yet still another object of the present invention is to provide a method of utilizing the device that provides a unique means of acquiring the apparatus; charging the batteries as necessary by using the power adapters; placing the scale assembly on a floor surface directly in front of a desired viewing location; affixing the display assembly to the desired surface viewing location; stepping onto the scale assembly, automatically activating the load cells to calculate the load and transmit the data to display the user's weight on the digital display; and, utilizing the apparatus each time a person approaches the desired surface to provide an incentive to lose weight, by displaying that person's current weight.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
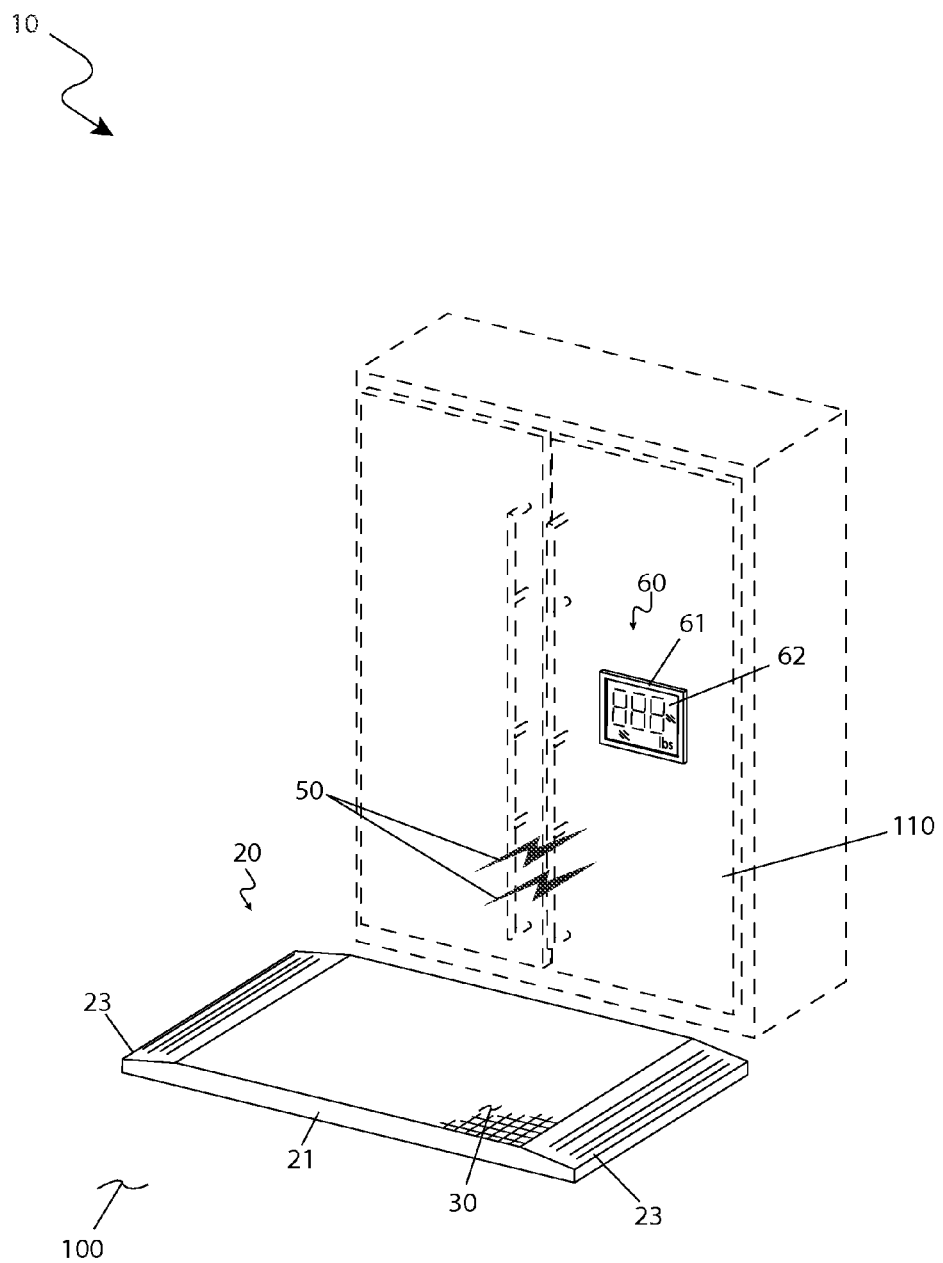
FIG. 1 is an environmental view of a weight scale with a remote readout 10, according to a preferred embodiment of the present invention.

DESCRIPTIVE KEY 10 weight scale with a remote readout
20 scale assembly
21 scale body
22 top plate
23 ramp
24*a* load cell
24*b* load cell case
24*c* upper portion
24*d* spring
24*e* strain gauge
24*f* mounting ear
25 scale power jack
26 transmitter module
27 scale power adapter
28 scale battery
29 internal portion
30 cover
50 signal
60 display assembly
61 display case
62 digital display
64 attachment means
65 display power jack
66 display power adapter
68 display battery
70 receiver module
75 electrical wire
100 floor surface
110 refrigerator door

DETAILED DESCRIPTION OF THE PREFERRED EMBODIMENT

The best mode for carrying out the invention is presented in terms of its preferred embodiment, herein depicted within FIGS. 1 through 7. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a weight scale with a remote readout (herein described as the "apparatus") 10, to provide a means to measure the weight of a person and wirelessly transmit and display said weight to provide an incentive for trying to lose weight.

Referring now to FIG. 1, a front environmental view of the apparatus 10, according to the preferred embodiment of the present invention, is disclosed. The apparatus 10 comprises a low-profile weight-measuring scale assembly 20 and a wireless display assembly 60. The scale assembly 20 comprises an integral weight scale and the display assembly 60 comprises a means to display a measured weight via a wireless signal 50. The scale assembly 20 is preferably positioned upon a floor surface 100 in front of a refrigerator, yet other locations may be utilized without limiting the scope of the apparatus 10. The display assembly 60 is preferably mounted to a refrigerator door 110, yet other locations may be utilized which enable the person to easily read the displayed weight without limiting the scope of the apparatus 10. The apparatus 10 is especially useful when applied to a refrigerator door 110; however, due to the portability of said apparatus 10, it is understood that mounting to other surfaces in a home would provide equal benefit and as such should not be interpreted as a limiting factor of said apparatus 10.

Figure 2:
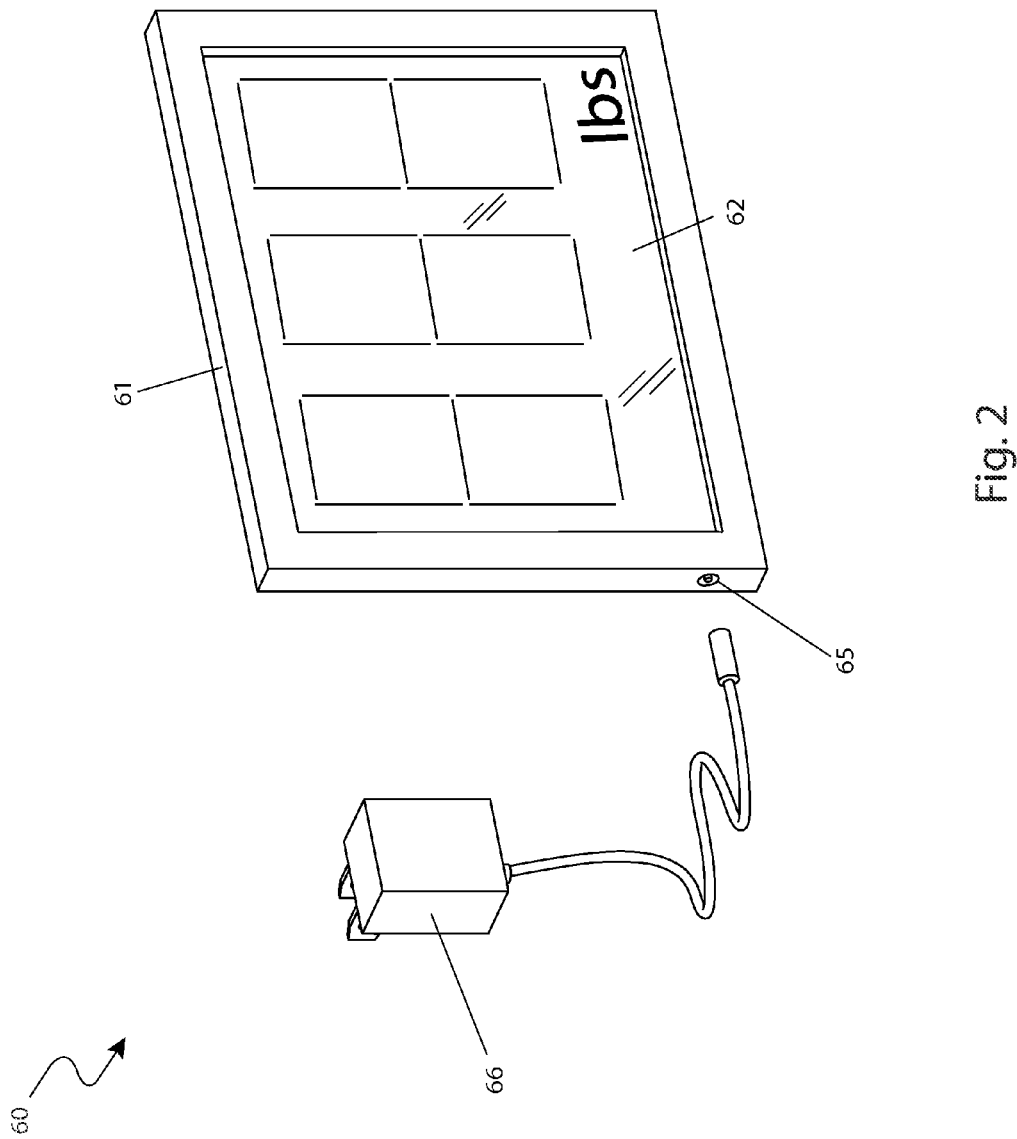
FIG. 2 is a front perspective view of a display assembly 60, according to a preferred embodiment of the present invention.
Figure 3:
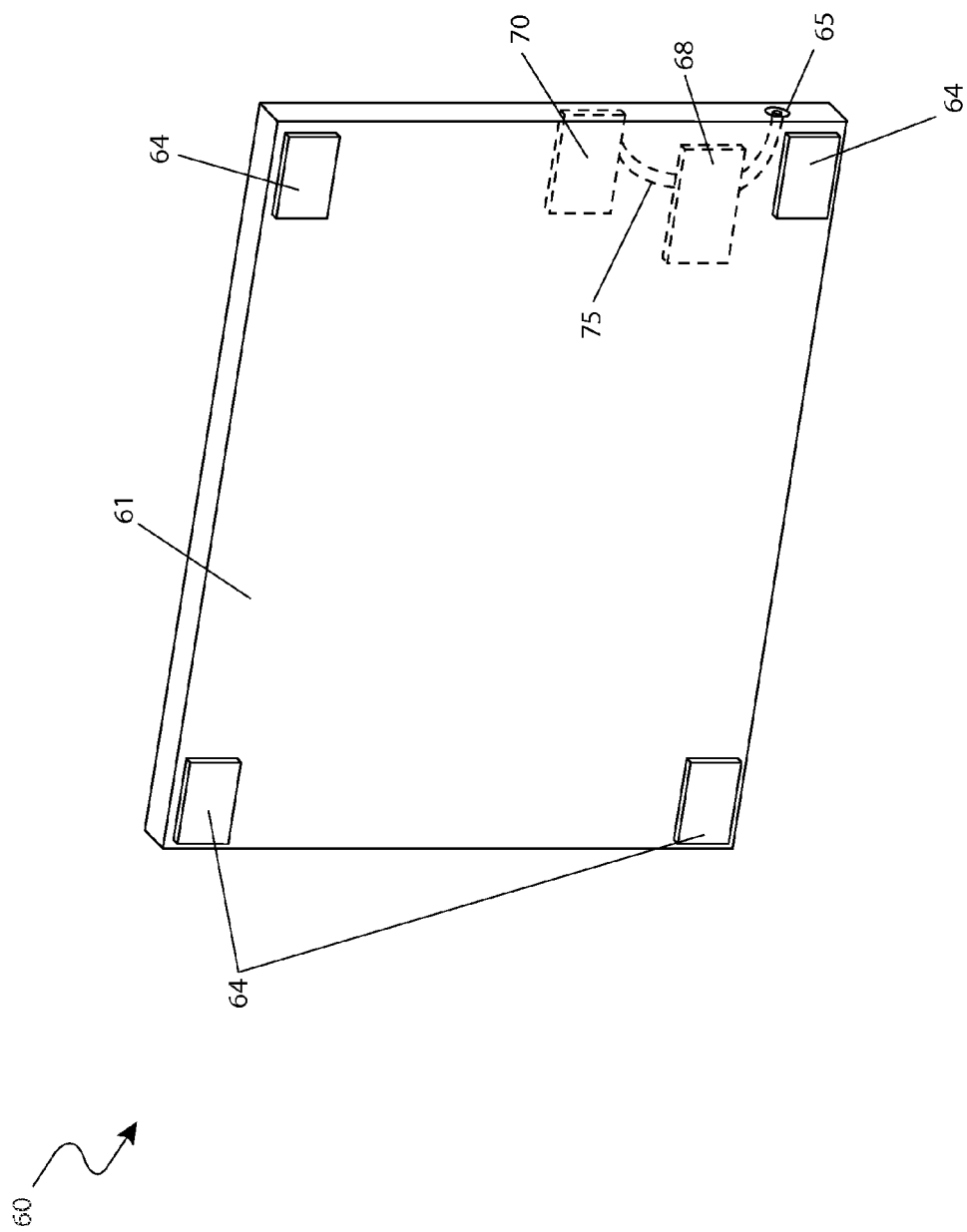
FIG. 3 is a rear perspective view of the display assembly 60, according to a preferred embodiment of the present invention.

Referring now to FIG. 2, a front perspective view of the display assembly 60 and FIG. 3, a rear perspective view of the display assembly 60, according to the preferred embodiment of the present invention, are disclosed. The display assembly 60 comprises a rectangular display case 61 having a digital display 62, an attachment means 64, and houses internal components. The display case 61 is preferably fabricated from a durable plastic, yet other materials may be utilized without limiting the scope of the apparatus 10. A front surface of the display case 61 reveals the digital display 62 which exhibits a person's weight in numeric characters. The digital display 62 is preferably a liquid crystal display (LCD) which displays common seven-segment decimal numerals which correspond to the persons weighed weight.

The display case 61 is suspended from a desired location such as a refrigerator door 110 via a plurality of attachment means 64 which are located on a rear surface of said display case 61. The attachment means 64 are depicted herein as being oriented upon each rear corner of the display case 61 for illustration purposes only, it is known that other locations may be utilized without limiting the scope of the apparatus 10. The attachment means 64 are preferably magnetic objects which enable a removably attachable affixing to the refrigerator door 110 or desired location. The attachment means 64 are affixed to the display case 61 with adhesives, yet other attachment means such as integral molding may be utilized without limiting the scope of the apparatus 10.

The display assembly 60 is powered via a common rechargeable display battery 68 (also see FIG. 7) which is housed within the display case 61. The display battery 68 is recharged by inserting a display power adapter 66 into a display power jack 65 and inserting said display power adapter 66 into a common household AC circuit. The display power adapter 66 includes a transformer to convert the AC current into DC levels. The display battery 68 provides power to the digital display 62 and a receiver module 70 (also see FIG. 7). The receiver module 70 comprises electronic equipment and embedded software capable of receiving and processing said wireless signal 50. The receiver module 70 in turn displays said received numeric weight data upon the digital display 62.

Figure 4:
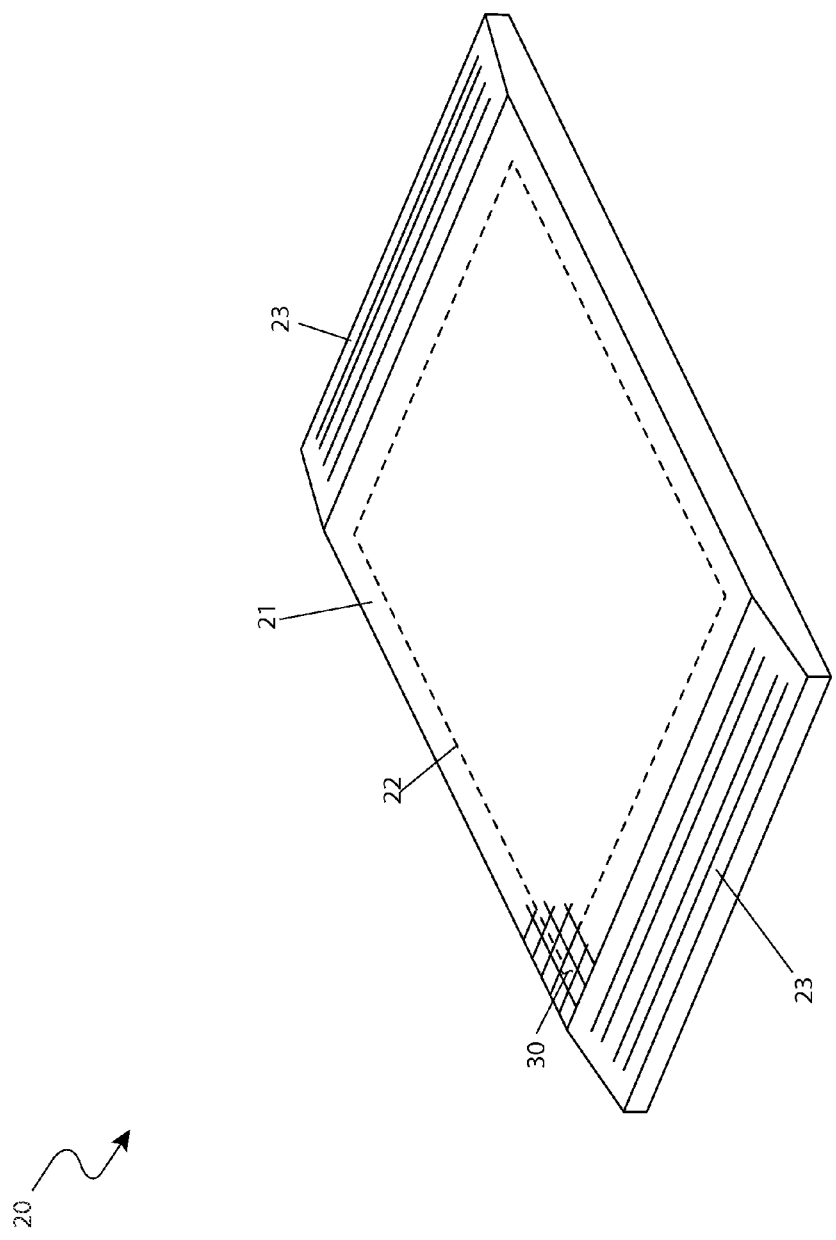
FIG. 4 is a front perspective view of a scale assembly 20, according to a preferred embodiment of the present invention.
Figure 5:
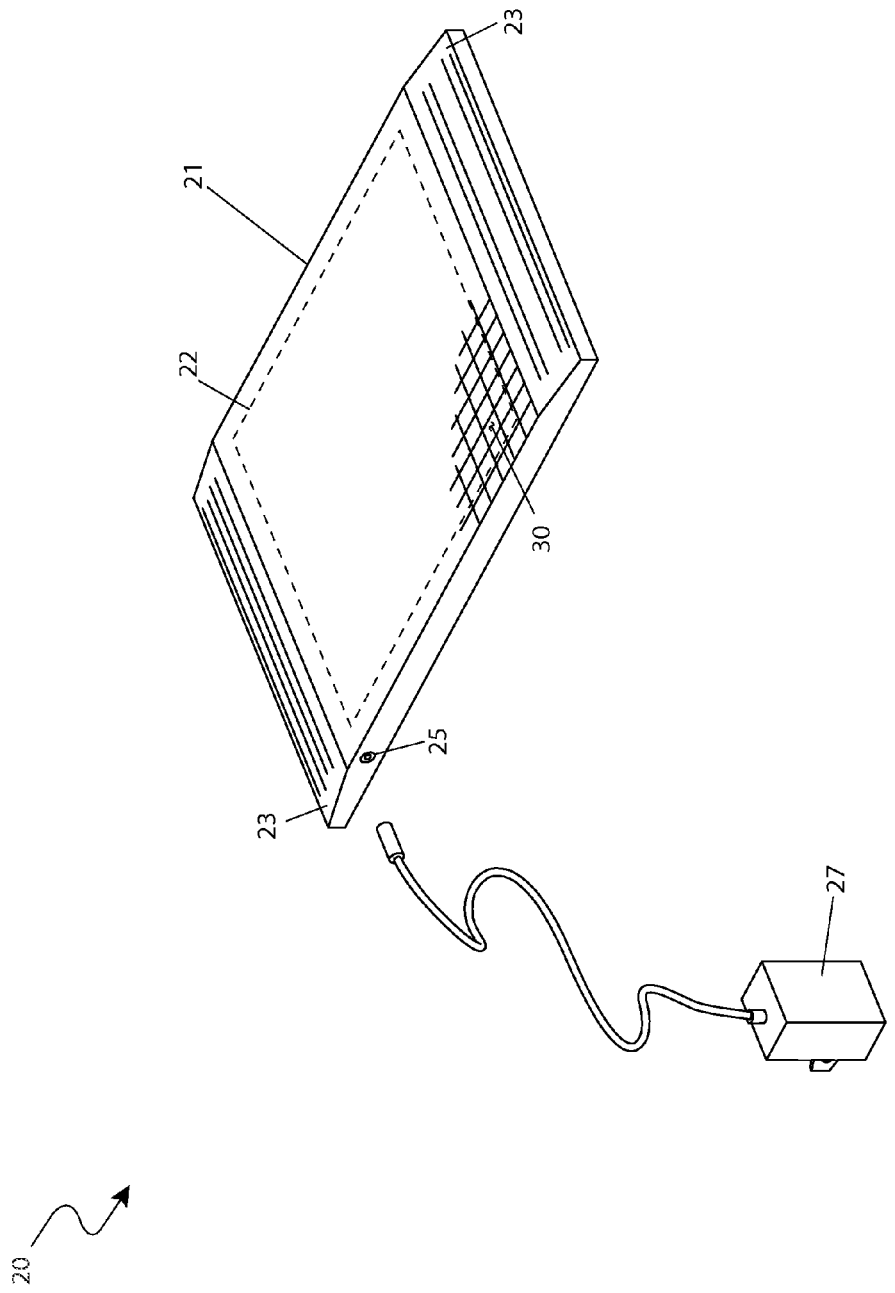
FIG. 5 is a rear perspective view of the scale assembly 20, according to a preferred embodiment of the present invention.
Figure 6:
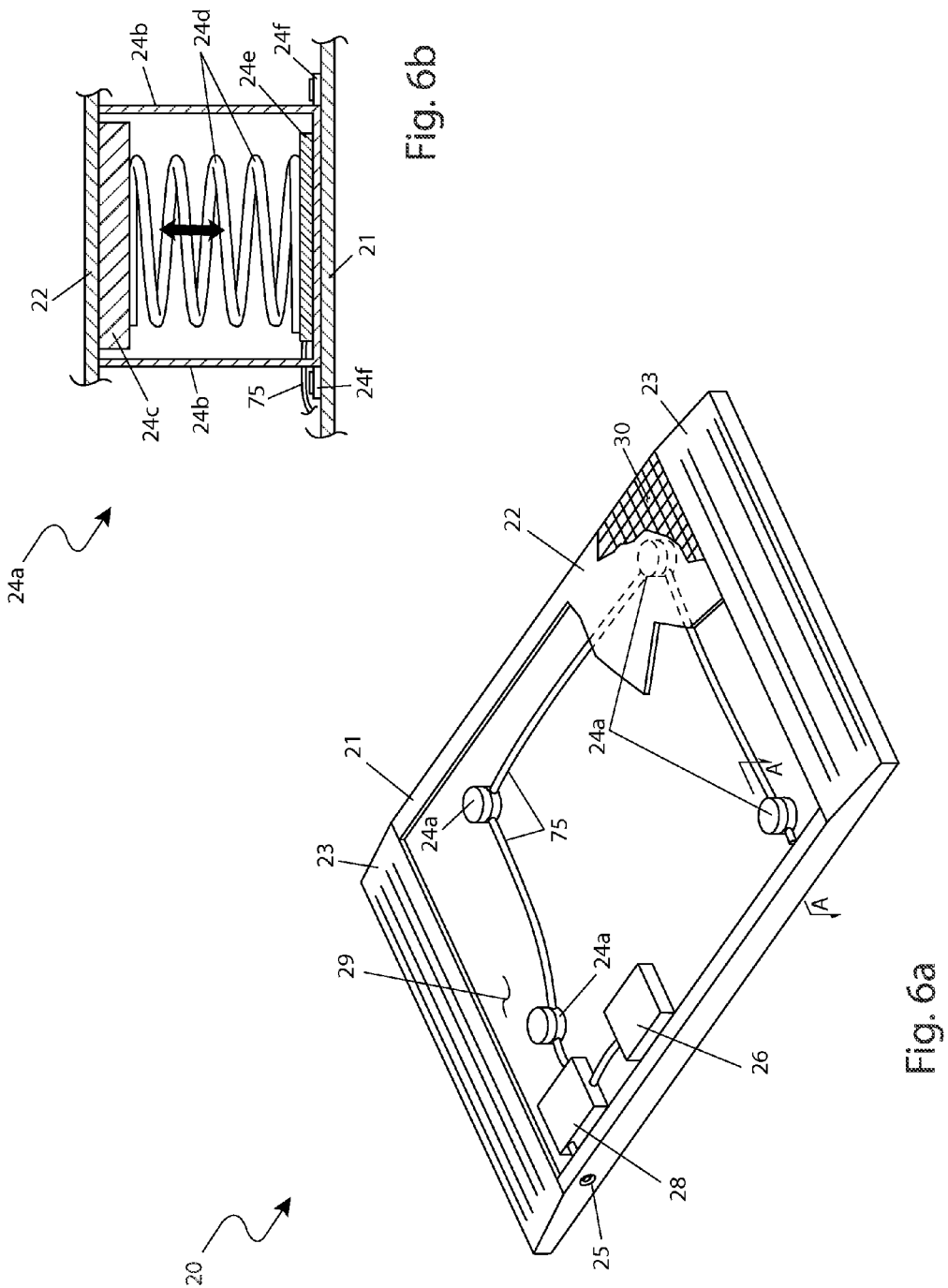
FIG. 6*a* is an exploded rear perspective view of the scale assembly 20, according to a preferred embodiment of the present invention.
FIG. 6*b* is a section view of a load cell 24*a* taken along line A-A (see FIG. 6*a*), according to a preferred embodiment of the present invention; and, FIG. 7 is an electrical block diagram of the weight scale with a remote readout 10, according to a preferred embodiment of the present invention.

Referring now to FIG. 4, a front perspective view of the scale assembly 20 and FIG. 5, a rear perspective view of the scale assembly 20, according to the preferred embodiment of the present invention, are disclosed. The scale assembly 20 comprises an integral low-profile generally rectangular scale body 21 being approximately three-quarters (¾) of an inch thick, further comprising a pair of opposing ramps 23 and a decorative protective cover 30. The scale body 21 is positioned on a level floor surface 100 (as shown in FIG. 1) in a desired location which is in close proximity of the display assembly 60. The scale body 21 provides a stable surface for a person to stand upon. Opposing end portions of the scale body 21 comprises a ramp 23 which prevents a tripping hazard along edge portions of the scale assembly 20. Each ramp 23 provides a gradually tapering edge portion to the floor surface 100 via an integrally molded cushioning underlayment having a generally triangular cross-sectional shape and is fabricated using a dense foam rubber or equivalent material. Furthermore, the scale body 21 is covered with the cover 30 which provides a comfortable and decorative surface for a person to stand upon and is fabricated using carpeting, a soft rubber mat, or the like.

The internal components of the scale assembly 20 are powered via a common rechargeable scale battery 28 (also see FIG. 7) which is housed within an internal portion 29 of the scale body 21 below a top plate 22. The top plate 22 horizontally extends across an intermediate portion of the scale body 21 and beneath the cover 30. The top plate 22 is fabricated of a sturdy metal or glass substrate to support a person's weight while being weighed. The scale battery 28 is recharged by inserting a scale power adapter 27 into a scale power jack 25 and inserting said scale power adapter 27 into a common household AC circuit. The scale power adapter 27 includes a transformer to convert the AC current into DC levels. The scale battery 28 provides power to a plurality of load cells 24*a* and a transmitter module 26 (also see FIGS. 6*a* and 6*b*). The transmitter module 26 provides various electronics and embedded software necessary to execute analog-to-digital conversion of the electrical signals from the load cells 24*a* and to subsequently provide wireless transmission of said weight data to the remotely located digital display assembly 60, via a wireless signal 50 (see FIG. 7). The transmitter module 26 is capable of converting data received from the load cells 24*a* and transmitting said data to the display assembly 60 via the wireless signal 50. The signal 50 utilizes a common wireless signal means such as infrared (IR), radio frequency (RF), or equivalent technology.

Referring now to FIG. 6*a*, an exploded rear perspective view of the scale assembly 20 and FIG. 6*b*, a section view of the load cell 24*a* taken along line A-A (see FIG. 6*a*), according to the preferred embodiment of the present invention, are disclosed. FIG. 6*a* depicts the cover 30 and the top plate 22 partially removed from the scale body 21 to illustrate the internal portion 29. This is for illustration purposes only and it is known that the scale assembly 20 is a solitary unit which is preferably unable to be disassembled. Beneath the top plate 22 are four (4) load cells 24*a* oriented at each corner of said top plate 22 to dispense the weight of the person equally. The load cells 24*a* provide support to said top plate 22 and provide a means for determining the weight of the person by converting a force into an electrical signal. Each load cell 24*a* comprises a disc-shaped load cell case 24*b* mounted to the internal portion 29 via a pair of mounting ears 24*f* which are mechanically fastened to said internal portion 29. The load cell case 24*b* houses an upper portion 24*c*, a spring 24*d*, and a strain gauge 24*e*. The upper portion 24*c* descends when a force is sensed (when a person stands upon the scale assembly 20) which correspondingly deflects the spring 24*d* against the strain gauge 24*e*. The strain gauge 24*e* is a thin metallic sheet whose conductivity changes when the spring 24*d* is deflected. The change in the conductivity of the strain gauge 24*e* is converted into digital data which is displayed upon the digital display 62. The digital data is transmitted to the receiver module 70 via the signal 50 from the transmitter module 26. Preferably, two (2) of the load cells 24*a* would comprise an electronic switching device to automatically activate the apparatus 10. The transmitter module 26 and scale battery 28 are preferably affixed to the internal portion via mechanical fasteners or the like. The load cells 24*a* and transmitter module 26 are powered from the scale battery 28 as above-mentioned.

Figure 7:
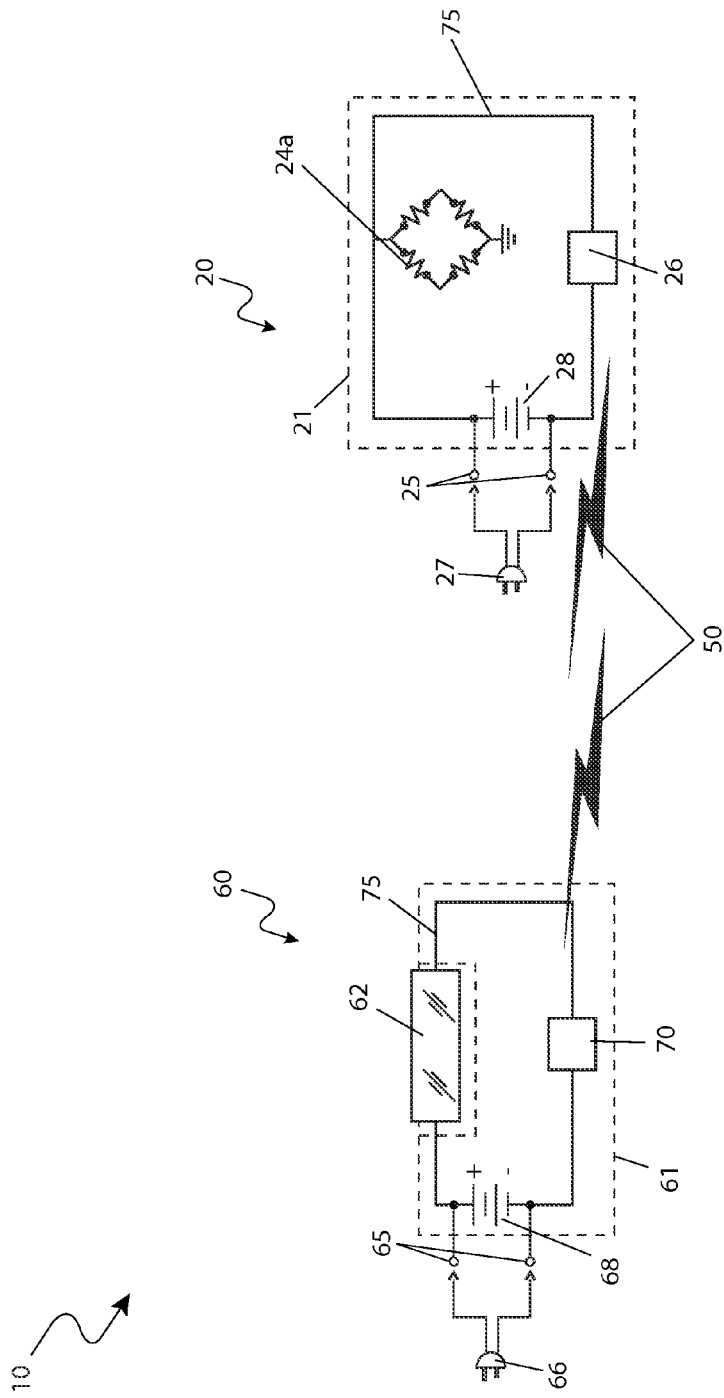

Referring now to FIG. 7, an electrical block diagram of the apparatus 10, according to a preferred embodiment of the present invention, is disclosed. Electrical direct current (DC) power is provided to the scale assembly 20 and display assembly 60 by batteries 28, 68 contained in respective assemblies 20, 60. Appropriately electrical wiring 75 interconnects the electrical components within each assembly 20, 60. Activation of the scale assembly 20 via the load cells 24*a* will also activate the display assembly 60 by triggering the receiver module 70. With the display assembly 60 activated the digital display 62 is able to display a person's weight which is transmitted from the signal 50 sent from the transmitter module 26. Each assembly 20, 60 preferably comprise an automatic resetting function and automatic deactivate function after a predetermined amount of elapsed time which would be handled by circuitry within the respective modules 26, 70.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIG. 1.

The method of installing and utilizing the apparatus 10 may be achieved by performing the following steps: acquiring the apparatus 10; charging the batteries 28, 68 as necessary via inserting the power adapters 27, 66 into respective power jacks 25, 65 and plugging in said power adapters 27, 66 into a household circuit; placing the scale assembly 20 upon a floor surface 100 directly in front of a desired surface; affixing the display assembly 60 upon the desired surface using the attachment means 64 at an eye-level position; stepping onto the scale assembly 20, thereby automatically activating the load cells 24a to calculate the load and transmitting the data to display a person's weight upon the digital display 62 of the display assembly 60; and, utilizing the apparatus 10 each time a person approaches the desired surface to provide an incentive to lose weight, by displaying said person's current weight.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A weight scale measuring and display system, comprising:
   a weight scale assembly, comprising:
      a low-profile generally rectangular scale body, having a planar top plate and a planar lower plate and having an interior;
      a pair of ramps located on opposing side edges of said scale body, each further comprising:
         a first end having a width coextensive with a width of said scale body;
         a second end having a gently tapering edge portion leading up to said first end; and,
         a cushioning underlayment;
      a durable and protective cover covering a top surface of said scale body;
      a scale power source located within said scale body interior;
      a plurality of load cells in electrical communication with said scale power source, each located within said scale body interior and having:
         a disc-shaped load cell case having a lower end mounted to said lower plate with fasteners routed through a pair of diametrically-opposed mounting ears and an upper end having an upper side affixed to said top plate;
         a spring within said load cell case having an upper end affixed to a lower side of said upper end; and,
         a strain gauge located on a bottom surface within said load cell case operably contacted by said spring and in electrical communication with said transmitter module;
      a transmitter module mounted within said scale body interior and in electrical communication with said strain gauge and said scale power source; and,
   a remote display assembly in electrical communication with said weight scale assembly;
   wherein said top plate comprises a durable and resilient material for withstanding an elevated weight of a body disposed thereon;
   wherein said plurality of load cells are mounted to positions of said top plate and positioned to evenly dispense said weight of said body;
   wherein said upper end descends upon a force of said body on said top plate and compresses said spring;
   wherein when said spring is compressed, said spring is deflected against said strain gauge to sense a sensed weight;
   wherein said strain gauge converts said sensed weight into a weight signal; and,
   wherein said strain gauge transmits said weight signal to said transmitter module;
   wherein said transmitter module receives said weight signal and transmits said weight signal; and,
   wherein said remote display assembly receives said weight signal and converts said weight signal to a displayed weight of said body and displays said displayed weight.

2. The system of claim 1, wherein said cover further comprises a soft rubber mat or a carpet.

3. The system of claim 1, wherein said scale power source further comprises:
   a rechargeable battery located within said scale body interior; and,
   a scale power adapter removably connected to a scale power jack located on a side surface of said scale body;
   wherein said scale power adapter is adaptable to be electrically connected to a conventional power source and transfers said power to said rechargeable battery when inserted into said scale power jack.

4. The system of claim 1, further comprising four load cells mounted adjacent to each corner of said top plate.

5. The system of claim 4, wherein two of said load cells comprise an electronic switching device to automatically activate said system.

6. The system of claim 1, wherein said remote display assembly further comprises:
   a durable display case, comprising an interior;
   an attachment means located on a rear surface of said display case;
   a display power source located within said display case;
   a receiver module in electrical communication with said transmitter module and said display power source; and,
   a digital display in electrical communication with said display power source, said digital display located on a front of said display case;
   wherein said display power source provides power to said receiver module and said digital display;
   wherein said receiver module receives said weight signal from said transmitter module;
   wherein said receiver module converts said weight signal into a displayed weight; and,
   wherein said digital display displays said displayed weight of said body.

7. The system of claim 6, wherein said display power source further comprises:
   a rechargeable battery located within said display case interior; and,
   a display case power adapter removably connected to a display case power jack located on a side surface thereof;
   wherein said display case power adapter is adaptable to be electrically connected to a conventional power source and transfers said power to said rechargeable battery when inserted into said display case jack.

8. The system of claim 6, wherein said attachment means further comprises a plurality of magnetic bodies adhesively attached to said display case.

9. A weight scale measuring and display system, comprising:
- a weight scale assembly, comprising:
  - a low-profile generally rectangular scale body, having a planar top plate and a planar lower plate and having an interior;
  - a pair of ramps located on opposing side edges of said scale body, each further comprising:
    - a first end having a width coextensive with a width of said scale body;
    - a second end having a gently tapering edge portion leading up to said first end; and,
    - a cushioning underlayment;
  - a durable and protective cover covering a top surface of said scale body;
  - a scale power source located within said scale body interior;
  - a plurality of load cells in electrical communication with said scale power source, each located within said scale body interior and having:
    - a disc-shaped load cell case having a lower end mounted to said lower plate with fasteners routed through a pair of diametrically-opposed mounting ears and an upper end having an upper side affixed to said top plate;
    - a spring within said load cell case having an upper end affixed to a lower side of said upper end; and,
    - a strain gauge located on a bottom surface within said load cell case operably contacted by said spring and in electrical communication with said transmitter module;
  - a transmitter module mounted within said scale body interior and in electrical communication with said strain gauge and said scale power source; and,
- a remote display assembly in wireless communication with said weight scale assembly;
- wherein said top plate comprises a durable and resilient material for withstanding an elevated weight of a body disposed thereon;
- wherein said plurality of load cells are mounted to positions of said top plate and positioned to evenly dispense said weight of said body;
- wherein said upper end descends upon a force of said body on said top plate and compresses said spring;
- wherein when said spring is compressed, said spring is deflected against said strain gauge to sense a sensed weight;
- wherein said strain gauge converts said sensed weight into a weight signal; and,
- wherein said strain gauge transmits said weight signal to said transmitter module;
- wherein said transmitter module receives said weight signal and transmits said weight signal; and,
- wherein said remote display assembly receives said weight signal and converts said weight signal to a displayed weight of said body and displays said displayed weight.

10. The system of claim 9, wherein said cover further comprises a soft rubber mat or a carpet.

11. The system of claim 9, wherein said scale power source further comprises:
- a rechargeable battery located within said scale body interior; and,
- a scale power adapter removably connected to a scale power jack located on a side surface of said scale body;
- wherein said scale power adapter is adaptable to be electrically connected to a conventional power source and transfers said power to said rechargeable battery when inserted into said scale power jack.

12. The system of claim 9, further comprising four load cells mounted adjacent to each corner of said top plate.

13. The system of claim 12, wherein two of said load cells comprise an electronic switching device to automatically activate said system.

14. The system of claim 9, wherein said remote display assembly further comprises:
- a durable display case, comprising an interior;
- an attachment means located on a rear surface of said display case;
- a display power source located within said display case;
- a receiver module in wireless communication with said transmitter module and said display power source; and,
- a digital display in electrical communication with said display power source, said digital display located on a front of said display case;
- wherein said display power source provides power to said receiver module and said digital display;
- wherein said receiver module wirelessly receives said weight signal from said transmitter module;
- wherein said receiver module converts said weight signal into a displayed weight; and,
- wherein said digital display displays said displayed weight of said body.

15. The system of claim 14, wherein said display power source further comprises:
- a rechargeable battery located within said display body interior; and,
- a display case adapter removably connected to a display case jack located on a side surface thereof;
- wherein said display case power adapter is adaptable to be electrically connected to a conventional power source and transfers said power to said rechargeable battery when inserted into said display case power jack.

16. The system of claim 14, wherein said attachment means further comprises a plurality of magnetic bodies adhesively attached to said display case.

* * * * *